(12) United States Patent
Bhardwaj

(10) Patent No.: US 11,550,727 B2
(45) Date of Patent: Jan. 10, 2023

(54) ZONE-AWARE MEMORY MANAGEMENT IN MEMORY SUBSYSTEMS

(71) Applicant: Micron Technology, Inc., Boise, ID (US)

(72) Inventor: Amit Bhardwaj, Hyderabad (IN)

(73) Assignee: MICRON TECHNOLOGY, INC., Boise, ID (US)

( * ) Notice: Subject to any disclaimer, the term of this patent is extended or adjusted under 35 U.S.C. 154(b) by 72 days.

(21) Appl. No.: 16/946,377

(22) Filed: Jun. 18, 2020

(65) Prior Publication Data

US 2021/0397562 A1 Dec. 23, 2021

(51) Int. Cl.
*G06F 12/10* (2016.01)
*G06F 12/02* (2006.01)

(52) U.S. Cl.
CPC .......... *G06F 12/10* (2013.01); *G06F 12/0253* (2013.01); *G06F 2212/1044* (2013.01); *G06F 2212/657* (2013.01)

(58) Field of Classification Search
CPC .............. G06F 12/0246; G06F 3/064; G06F 2212/7201; G06F 12/0292; G06F 12/0238; G06F 12/02; G06F 12/0223; G06F 12/0253; G06F 12/0284
USPC .................. 711/103, E12.008, 206, E12.014
See application file for complete search history.

(56) References Cited

U.S. PATENT DOCUMENTS

| 5,341,339 A * | 8/1994 | Wells ............... G06F 12/0246 365/185.11 |
| 9,075,714 B1 * | 7/2015 | Tsai ................. G11B 20/1889 |
| 9,448,919 B1 * | 9/2016 | Boyle ................ G06F 3/0619 |
| 10,126,981 B1 * | 11/2018 | Malina ............... G06F 3/0647 |
| 2005/0162930 A1 * | 7/2005 | Mukaida ............... G11C 29/76 711/E12.008 |
| 2010/0268864 A1 * | 10/2010 | Ramiya Mothilal ..... H04L 9/12 713/193 |
| 2011/0041039 A1 * | 2/2011 | Harari ................ G11C 29/76 714/773 |

(Continued)

OTHER PUBLICATIONS

Micron Technology, Inc., "Wear-Leveling Techniques in NAND Flash Devices," Oct. 2008, 8 pages.

(Continued)

*Primary Examiner* — Sanjiv Shah
*Assistant Examiner* — Edward Waddy, Jr.
(74) *Attorney, Agent, or Firm* — Lowenstein Sandler LLP

(57) ABSTRACT

Disclosed is a system including a memory device having a plurality of physical memory blocks and associated with a logical address space that comprises a plurality of zones, wherein each zone comprises a plurality of logical block addresses (LBAs), and a processing device, operatively coupled with the memory device, to perform operations of receiving a request to store data referenced by an LBA associated with a first zone of the plurality of zones, obtaining a version identifier of the first zone, obtaining erase values for a plurality of available physical memory blocks of the memory device, selecting, in view of the version identifier of the first zone and the erase values, a first physical memory block of the plurality of available physical memory blocks, mapping a next available LBA within the first zone to the first physical memory block, and storing the data in the first physical memory block.

19 Claims, 9 Drawing Sheets

(56) References Cited

U.S. PATENT DOCUMENTS

| | | | | |
|---|---|---|---|---|
| 2012/0084622 A1* | 4/2012 | D'Abreu | ............. | G06F 11/1048 |
| | | | | 714/755 |
| 2012/0254511 A1* | 10/2012 | Yeh | ................... | G06F 11/1048 |
| | | | | 711/103 |
| 2015/0067239 A1* | 3/2015 | Chu | ................... | G06F 12/0246 |
| | | | | 711/103 |
| 2018/0307417 A1* | 10/2018 | Dubeyko | ................ | G06F 3/064 |
| 2021/0132827 A1* | 5/2021 | Helmick | ............... | G06F 3/0679 |

OTHER PUBLICATIONS

NVM Express, "NVM Express Base Specification," Revision 1.4; Jun. 10, 2019, 403 pages.

\* cited by examiner

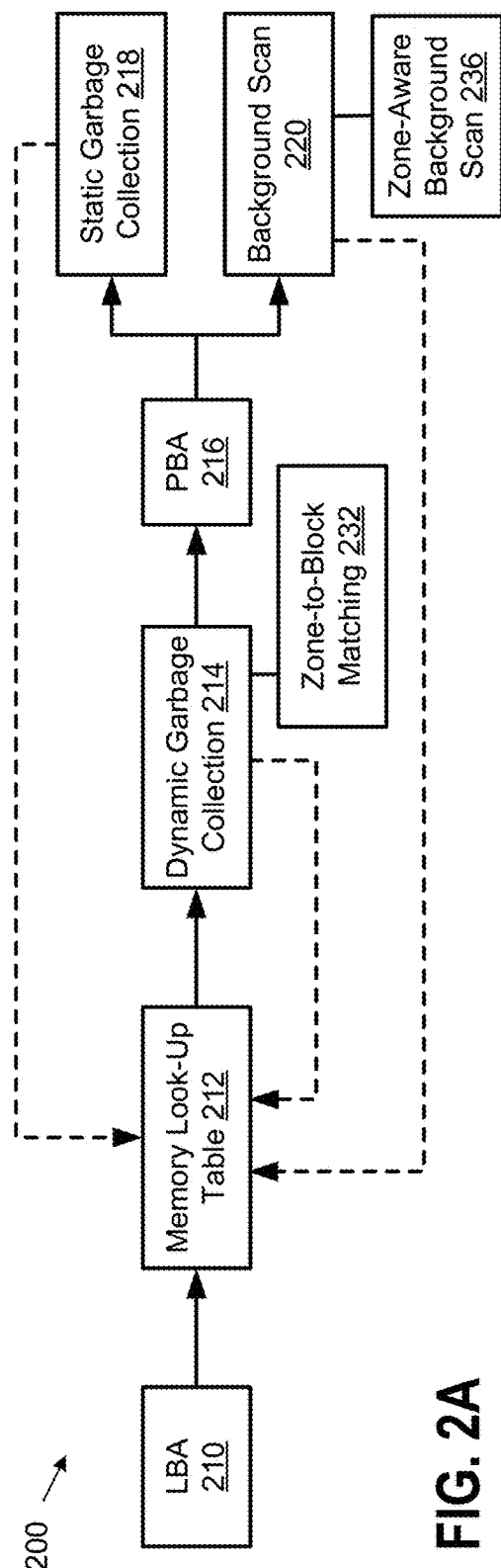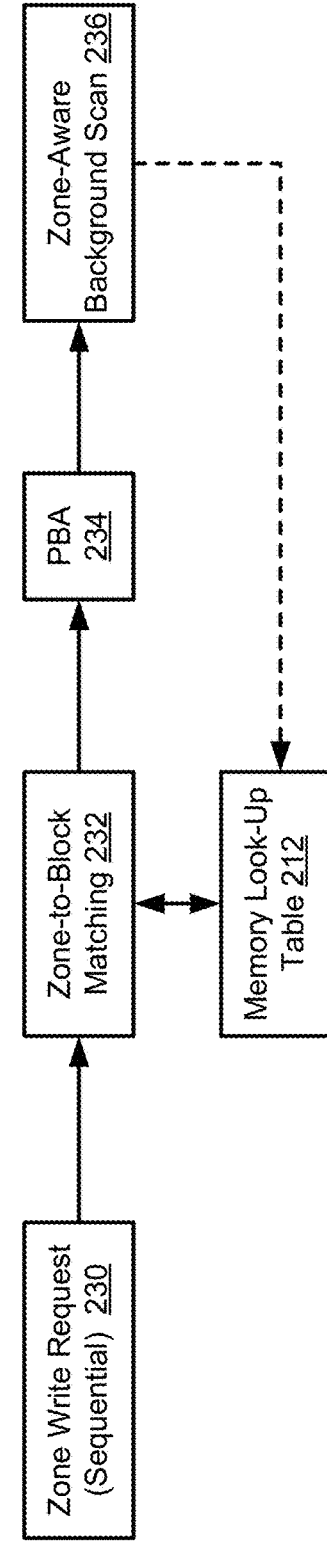
FIG. 2A
FIG. 2B

| Zone (VN₁) | Fail | Fail | Good | Fail | Good | Fail |
|---|---|---|---|---|---|---|
| Zone (VN₂) | Fail | Good | Fail | Good | Fail | Good |
| Zone (VN₃) | Fail | Good | Fail | Good | Good | |
| Zone (VN₄) | Good | Good | Good | | | |
| Zone (VN₅) | | | | | | |
| Zone (VN₆) | | | | | | |

FIG. 6C

ZONE-AWARE MEMORY MANAGEMENT IN MEMORY SUBSYSTEMS

TECHNICAL FIELD

Embodiments of the disclosure relate generally to memory sub-systems, and more specifically, relate to zone-aware memory management in memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure.

FIGS. 2A-B illustrate schematically a high-level description of a zone-aware memory management in memory sub-systems.

FIG. 6C schematically illustrates an example zone-aware background scan performed in accordance with some embodiments of the present disclosure.

DETAILED DESCRIPTION

Figure 1:
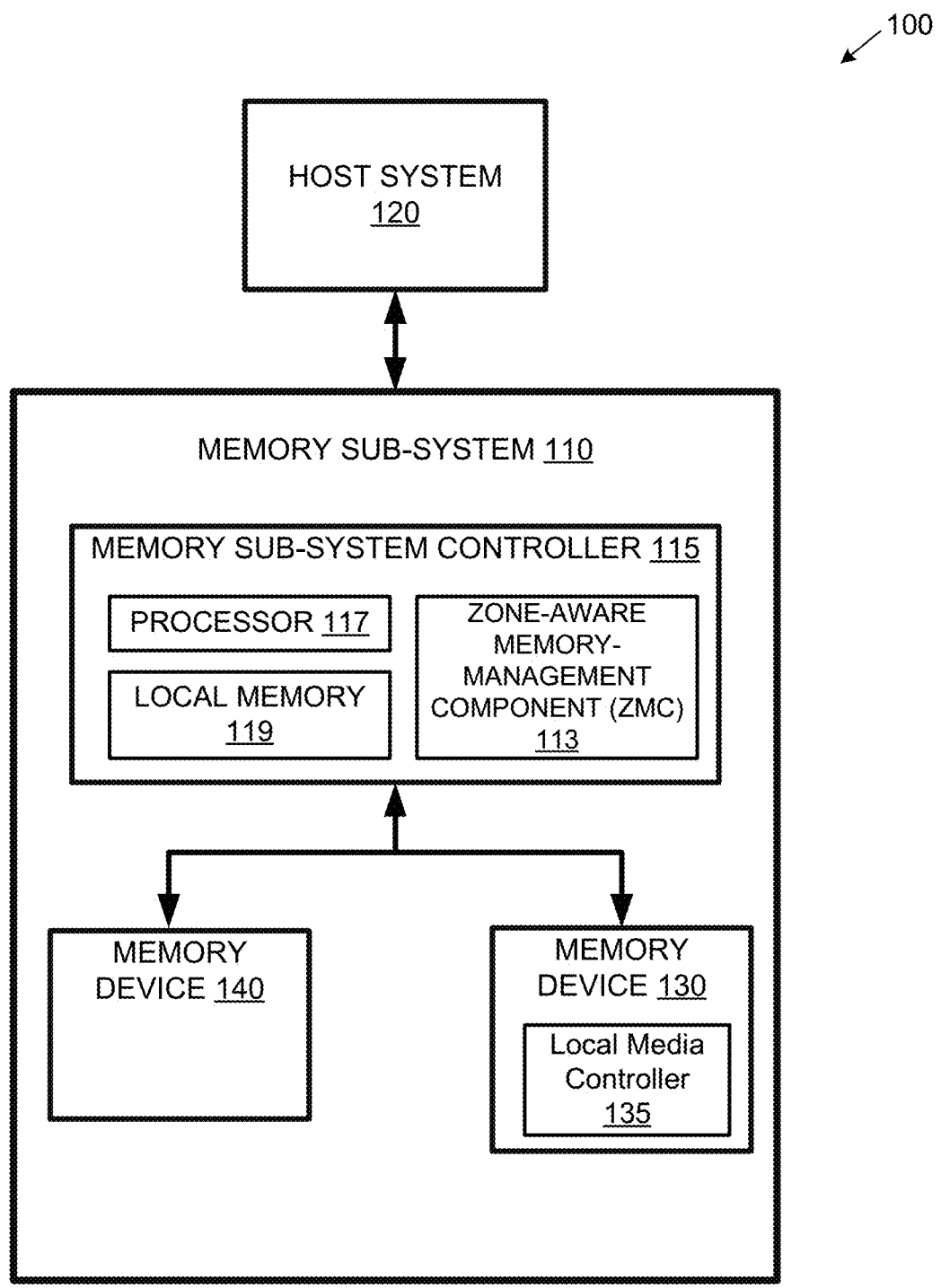
FIG. 1 illustrates an example computing system that includes a memory sub-system in accordance with some embodiments of the present disclosure.

Aspects of the present disclosure are directed to zone-aware memory management in memory sub-systems that uses version numbering of memory zones. A memory sub-system can be a storage device, a memory module, or a hybrid of a storage device and a memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

The memory devices can be non-volatile memory devices that can store data from the host system. One example of a non-volatile memory device is a negative-and (NAND) memory device. Other examples of non-volatile memory devices are described below in conjunction with FIG. 1. Each of the memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values.

Various access operations can be performed on the memory cells. Data can be written to, read from, and erased from memory cells. Memory cells can be grouped into a write unit, such as a page. For some types of memory devices, a page is the smallest write unit. A page is a set of cells across the same word line. A page size represents a particular number of cells of a page. For some types of memory devices (e.g., NAND), memory cells can be grouped into an erase unit, such as a physical block, which is a group of pages. A physical block is a 2-dimensional memory array of pages (rows of cells) and strings (columns of cells). Data can be written to a block, page-by-page. Data can be erased at a block level. However, portions of a block cannot be erased.

A page of a block can contain valid data, invalid data, or no data. Invalid data is data that is marked as outdated as a new version of the data is stored on the memory device. Invalid data includes data that was previously written but is no longer associated with a valid logical address, such as a logical address referenced by a host system in a physical to logical (P2L) mapping table. Valid data is the most recent version of such data being stored on the memory device. A memory sub-system can mark data as invalid based on information received, for example, from an operating system. A page that does not contain data includes a page that has been previously erased, and not yet written to.

A memory sub-system controller can perform operations for media management algorithms, such as wear leveling, refresh, garbage collection, scrub, etc., to help manage the data on the memory sub-system. A block may have some pages containing valid data and some pages containing invalid data. To avoid waiting for all of the pages in the block to have invalid data in order to erase and reuse the block, an algorithm hereinafter referred to as "garbage collection" can be invoked to allow the block to be erased and released as a free block for subsequent write operations. Garbage collection is a set of media management operations that include, for example, selecting a block that contains valid and invalid data, selecting pages in the block that contain valid data, copying the valid data to new locations (e.g., free pages in another block), marking the data in the previously selected pages as invalid, and erasing the selected block.

"Garbage collection" hereinafter refers to selecting a block, rewriting the valid data from the selected block to another block, and erasing all invalid data and valid data stored at the selected block. The valid data from multiple selected blocks can be copied to a smaller number of other blocks and the selected blocks can then be erased. As a result, the number of blocks that have been erased can be increased such that more blocks are available to store subsequent data from a host system. However, efficient memory management can be compounded by intrinsic memory sub-system design limitations: typical transistor-based memory cells wear down after a certain number of erase operations (ranging from a few thousands in triple-level cells to tens of thousands or more in single-level cells), when the ability of the floating gates to consistently hold charge diminishes significantly.

Some memory management schemes may deploy zoned namespaces (ZNS), herein also referred to as "zones." Zones are partitions of a logical address space of the memory device configured in such a way that logical block addresses (LBAs) of each zone are to be used in write operations sequentially, starting from low-end LBAs. A range of LBAs belonging to a specific zone can be dedicated to a particular host application, and separate applications may have access only to zones dedicated to those applications. Because each zone's LBAs are written to sequentially, rewriting data already stored in the zone requires invalidating the entire zone (by, e.g., moving a write pointer to the starting LBA of the zone). Using zoned namespaces allows more efficient (faster) read, write, and erase operations and reduces the need for over-provisioning of memory blocks to various applications (by reducing the number of blocks that otherwise would store invalid data and which have to be factored in when memory is allocated to the applications).

Nonetheless, ZNS architecture does not completely eliminate the need for efficient memory management. For example, different applications can store (and update) data at different rates. As a result, some of the zones can be overwritten only a few times while other zones are overwritten significantly more often. If LBA-to-physical memory block mapping remains static, it can result in a significant gap in erase counts among physical memory blocks used by different applications. For example, zones used to store relatively static libraries of data can be overwritten very rarely whereas zones that are used to store temporary computational data or short-term cache can be overwritten at a significant rate.

Aspects of the present disclosure address the above and other deficiencies by describing a zone-aware memory management in memory sub-systems. In some embodiments, the memory controller of the memory sub-system can keep track of the number of times a zone has been overwritten—the version number (VN) of the zone—in addition to keeping track of the number of times that various physical blocks have been erased. In some embodiments, when an application (e.g., running on the host system) requests to store data in an association with a particular zone, the application can specify an identifier of the zone, which can be a starting (lowest) LBA of the zone or any other pointer that specifies the zone. In response to receiving the identifier, the memory controller can determine a VN of the zone and further obtain erase counts (EC) of available physical memory blocks, which can be identified by their respective physical block addresses (PBA). The memory controller can select a block based on the VN of the zone in such a way that a "cold" zone with a low VN (indicating a low likelihood that the zone will be invalidated in the future) is associated with a high-EC "hot" physical memory block (i.e., a block that has fewer erase operations left in its life cycle than an average block of the memory sub-system). Conversely, the memory controller can associate a "cold" physical memory block (a block with a low EC) to a "hot" zone with a high VN (indicating a high probability that the zone will be invalidated often in the future). Having selected an appropriate physical block, the memory controller can match the next available LBA of the zone to the PBA of the selected block, write the data to the selected block, and store the LBA-to-PBA association (e.g., in a memory look-up table) for subsequent read and erase operations that can be directed by the application to the LBA.

In some embodiments, the memory controller (or a local media controller) can perform (e.g., at idle time or periodically) background scans of the physical memory blocks of the memory sub-system to determine if data in some of the blocks is at risk of becoming corrupted. For example, data that has been stored in a particular block for a long time may be compromised due to physical (electrostatic) interference from other (e.g., physically proximate) blocks undergoing various read, write, and/or erase operations. A background scan can perform error correction code (ECC) analysis of at least some blocks and schedule those blocks whose bit error rate (BER) exceeds a certain threshold for folding, which refers to refreshing data stored therein by moving the data to other blocks. In the zone-aware memory management, a background scan can take only a fraction of time that it would take to check all blocks of the memory sub-system. More specifically, because a low VN is indicative of long storage times (without erasing) of data stored in association with the zone (and the zone's LBAs), the background scan can start with the lowest VN-zone as the physical memory blocks of such a zone (having been overwritten the fewest number of times) are more likely to be at risk of data loss.

Furthermore, because high EC-blocks are used, as described above, to store data in (i.e., in association with) low-VN zones, such high-EC blocks can be closer to their resource limits and, therefore, are at the higher risk of becoming compromised. Accordingly, once it is determined, by the ECC operation, that blocks of a particular zone (e.g., a zone with N-th lowest VN) are within a low-risk BER range, the background scan can be stopped. Additionally, because within each zone data is stored in (i.e., in association with) sequential LBAs, it can be sufficient to scan only the physical memory blocks associated with lower LBAs of each zone, as such blocks have been storing data for the longest time and are, therefore, at the highest risk of becoming compromised. Once it is determined by the ECC operation that a certain number of (e.g., consecutive) physical blocks of the zone are within a low-risk BER range, the background scan for that particular zone can be ceased (and the next zone can be scanned, if necessary). As a result, only a small fraction of the physical blocks associated with each zone, and only a limited number of zones, may have to be scanned.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115, for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address LBA, zoned namespace) and a physical address (e.g., physical block address PBA) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a zone-aware memory-management component (ZMC) 113 which can, responsive to receiving a request to store data in specific zone, access the version number (VN) of the zone, obtain ECs of at least a subset of available physical memory blocks (e.g., blocks that currently do not store data or store data that has been invalidated), and select a PBA of an optimal block to store the data. The optimal block to store the data can be a block whose EC correlates negatively with the zone VN, as described in more detail in reference to FIG. 3 below, to ensure an even wear across the memory devices 130 and/or 140. The ZMC 113 can further perform zone-aware background scans of one or more memory devices 130, 140 by scanning zones in the order of their version numbers and by scanning physical blocks associated with LBAs of each zone starting from the lowest LBA (oldest-write PBA). In some embodiments, the ZMC 113 can stop scanning blocks within a given zone once a first condition is satisfied. For example, the ZMC 113 can determine that a pre-determined number of blocks (e.g., consecutive blocks) within the zone being scanned have BER that is below an "at-risk" threshold. In some embodiments, the ZMC 113 can similarly stop scanning zones once a second condition is satisfied. For example, the ZMC 113 can determine that the number of at-risk blocks in one or more zones does not exceed a second pre-determined number of blocks. In various other embodiments, however, different first and second conditions can be used, as explained in more detail in reference to FIG. 6. During operations of the memory sub-system 110, the VNs of various zones of the memory sub-system 110 can be stored in one of the memory devices 130 and/or 140, or in a separate data structure accessible to the memory controller 115 (or local media controller 135). The memory device or the separate data structure can be a volatile memory structure (e.g., DRAM). In some embodiments, when the memory sub-system 110 is powered up and the memory controller 115 (and/or local media controller 135) is initialized, the VNs can be fetched from the non-volatile memory (e.g., NAND memory) to the volatile memory structure. When a zone is invalidated, the VN of the zone can be updated in the volatile memory structure, and also copied to the non-volatile memory, to preserve the VN in case of an unexpected power outage.

In some embodiments, the ZMC 113 can perform background scans during idle time of the memory sub-system, e.g., when a number of write, erase, and/or read requests per unit of time falls below a certain set threshold. In some embodiments, the ZMC 113 can perform background scans responsive to a number (e.g., percentage) of the most recent read or write operations that failed. In some embodiments, the ZMC 113 can perform background scans at fixed intervals of time since the commencement (or conclusion) of an earlier scan. In some embodiments, the ZMC 113 can perform background scans at specific time intervals—every hour, every day, or every other time unit, as configured by the memory sub-system 110 and/or by the host system 120, or by a human operator (e.g., a production engineer or a system administrator). In some embodiments, the monitoring schedule of the background scans can be stored in the local memory 119 (e.g., in the embedded memory).

In some embodiments, the memory sub-system controller 115 includes at least a portion of the ZMC 113. For example, the memory sub-system controller 115 can include a processor 117 (processing device) configured to execute instructions stored in local memory 119 for performing the operations described herein. In some embodiments, the ZMC 113 is part of the host system 120, an application, or an operating system. In some embodiments, the ZMC 113 can have configuration data, libraries, and other information stored in the memory device 130 (and/or the memory device 140).

FIGS. 2A-B illustrate schematically a high-level description of zone-aware memory management in memory sub-systems. FIG. 2A depicts one embodiment 200 of the memory management. FIG. 2B depicts another embodiment 202 of the memory management. As illustrated in FIG. 2A, the host system 120 (e.g., its operating system or any application executed on the host system 120) can communicate a read, write, or erase request to the memory sub-system 110. The request can include an LBA 210 within the logical space of the memory subsystem 110, or within a part of the logical space accessible to the originator of the request. The LBA 210 can be used by the memory sub-system controller 115 to identify a physical memory partition (block, page, plane, etc.) to which the received memory request is related. For example, the memory sub-system controller 115 can access a memory look-up table 212 to determine the PBA 216 that corresponds to the LBA 210. The controller 115 can subsequently execute the received memory request using the corresponding block identified by the determined PBA 216. For example, the controller 115 can read data stored in the corresponding block (and provide the data to the processing device of the host system 120) or write the data into the corresponding block. In some instances, when the data in the block is to be overwritten or if there is no block currently assigned to the LBA 210, the controller 115 can first perform the dynamic garbage collection (GC) routine (214). For example, the controller 115 can identify an appropriate block (by its PBA 216), which can be a block that has the smallest number of erase counts, or, more generally, a block that has been erased fewer times than an average block in the memory device. Upon such identification, the controller 115 can write the new data into the identified block. The controller 115 can also update the memory look-up table 212 (as indicated by the dashed line connecting boxes 214 and 212) with the new memory translation LBA→PBA. In the instances where the memory request is an overwrite request, the controller 115 can also invalidate the data that has been stored in the old block (previously identified by the LBA 210) and update the memory look-up table 212 with the new memory translation LBA→PBA.

After the memory request is executed, e.g. during a downtime or a scheduled GC time, the controller 115 can perform static GC 218 and/or background scan 220. During static GC 218, "cold" data that has been overwritten only a few times (e.g., fewer than an average block of the memory device) may be identified and moved to blocks that have above-average erase count (EC) and are, therefore, closer to the end of their resource limit compared with other blocks. During background scan 220, the memory sub-system controller 115 can identify blocks that are at an elevated risk of having too many bits corrupted so that the error-correction code (ECC) may eventually be unable to repair the data stored thereon. Such blocks can be folded (copied to new locations with old locations erased or invalidated, i.e., scheduled for erasure) to other blocks, e.g., to blocks having a lower EC. Upon completion (or, in some embodiments, during execution) of the static GC 218 and/or background scan 220, the controller 115 can update the memory look-up table 212 (as indicated by the corresponding dashed lines) with the new memory translations LBA→PBA. In some embodiments, dynamic GC 214 can include zone-to-block matching 232 and background scan 220 can include a zone-aware background scan 236, as described in more detail in reference to FIG. 2B below.

As illustrated in FIG. 2B, according to some embodiments of the present disclosure, the host system 120 can generate a zone write request 230 and communicate this request to the memory sub-system 110. Because write requests in the zoned namespace architecture are executed using sequential LBAs assigned to a respective zone, the request 230 can identify the zone, but need not specify an LBA. The controller 115 may perform zone-to-block matching 232, as described in more detail in reference to FIG. 3 below. During zone-to-block matching 232, the controller can identify a physical memory block to be used to store data referenced in the write request 230 for optimal performance of the memory device (e.g., maximization of its lifetime and long-term capacity). For example, the controller 115 can match zones with low version numbers (VN) to blocks with high EC, under the expectation that zones that have been invalidated rarely in the past are likely to retain data without the data being overwritten for extended periods of time in the future. Conversely, the controller 115 can match zones with high VN (that are expected to be invalidated often in the future) to blocks with low EC. The memory sub-system controller 115 can subsequently update the memory look-up table 212 with the LBA→PBA translation, wherein LBA is the next available logical address of the zone and PBA (234) is the physical address of the block identified during zone-to-block matching 232 and used for the execution of the write request.

During a downtime or a scheduled GC time, the controller 115 can perform a zone-aware background scan 236. Specifically, the memory sub-system controller 115 can identify blocks that are at an elevated risk of data loss (e.g., blocks having too many bits corrupted to be repairable via ECC operations). Such blocks can be folded to other blocks, e.g., blocks with a lower EC. A zone-aware background scan 220 can start with the zone having the lowest VN. Such zones have physical memory blocks assigned to them that have not been erased for the longest times and, therefore, are at the highest risk of data loss. Within each zone, at the highest risk of data loss are blocks associated with LBAs near the start of the zone (since these blocks have not been overwritten/erased for the longest times among the blocks assigned to the zone). Accordingly, the controller 115 can start block testing from the beginning of the zone's LBAs and cease the background scan of that particular zone once a specific (e.g., predetermined) number of blocks have successfully passed block testing criteria. Likewise, the controller 115 can test different zones sequentially, in the order of increasing VN, and stop the background scan of the memory device once a pre-determined number of zones have successfully passed zone-testing criteria. Blocks that are identified as "at-risk" blocks can be folded to other blocks using a procedure that is similar to the zone-to-block matching 232 described above. During (or after completion) of the zone-aware background scan 236, the controller 115 can update the memory look-up table 212 (as indicated by the dashed line) by replacing folded blocks PBAs with the new blocks PBAs in the stored LBA→PBA translations.

Figure 3:
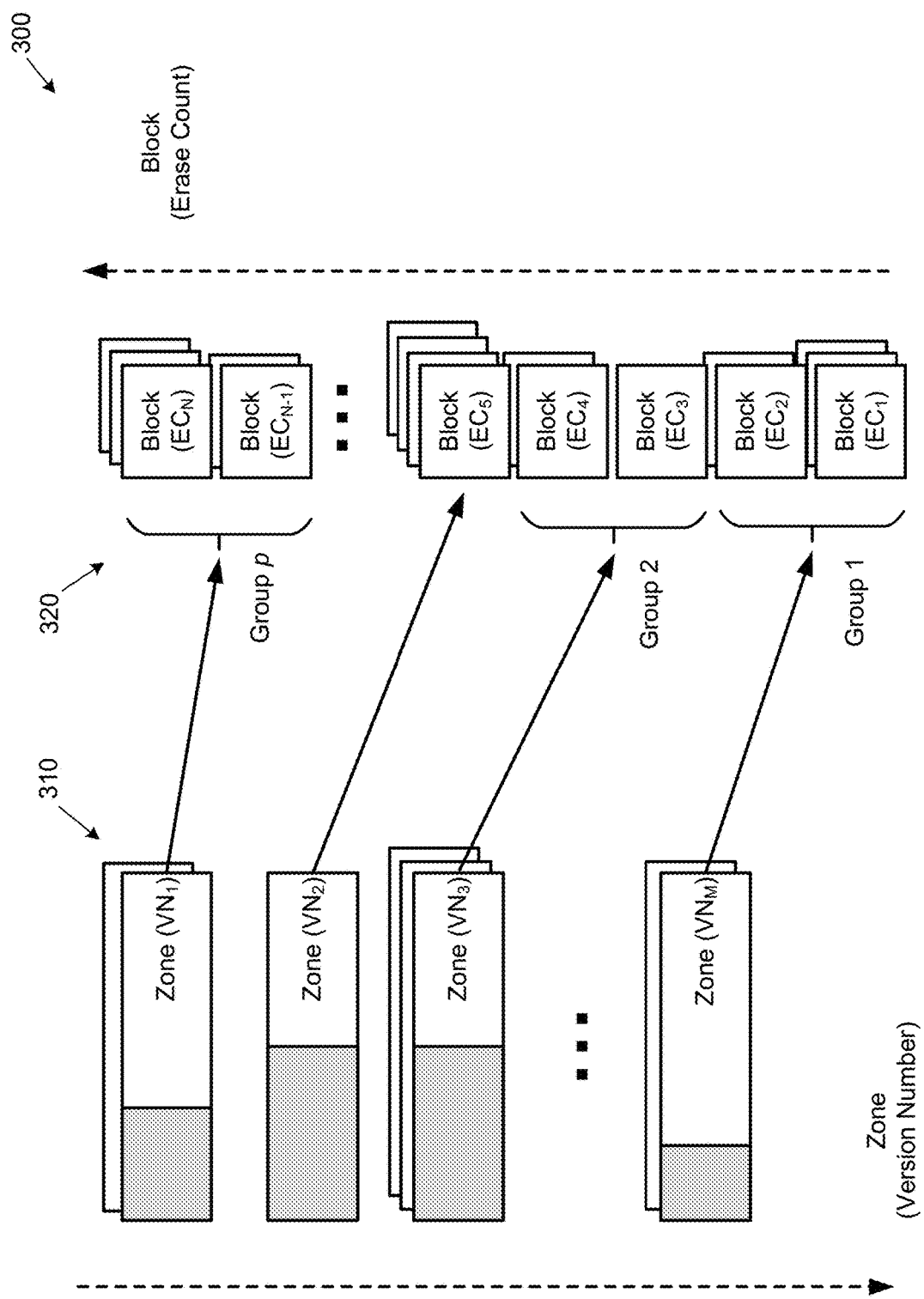
FIG. 3 illustrates schematically zone-to-block matching in a zone-aware memory management, in accordance with some embodiments of the present disclosure.

FIG. 3 illustrates schematically zone-to-block matching 300 in a zone-aware memory management, in accordance with some embodiments of the present disclosure. Shown in the left are schematic depictions of a set of zones 310 of a memory device ranked in the increased number of their VN (from top to bottom). Various zones are denoted by "Zone (VN)" with $VN_1$ being the lowest current VM among the zones of the memory device and $VN_M$ being the highest current VM. There can be an arbitrary number of zones with a given VN, as depicted with multiple zones associated with some of the VN (e.g., as depicted, there are three zones with $VN3_3$ and two zones with $VN_M$. As illustrated schematically by graying (denoting filling of the zones), the zones 310 can be written into in a consecutive fashion, e.g., from the lower (senior) LBAs to higher (junior) LBAs. When the zone is fully filled, any subsequent write operations associated with the zone require invalidating the entire zone. Likewise, writing or erasing operation performed in association with an LBA belonging to a grey (written) part of the zone can be performed once the entire zone is invalidated.

Shown in the right of FIG. 3 are schematic depictions of a set of physical memory blocks 320 available to the zones 310. The blocks 320 are ranked by the increased number of their EC (from bottom to top). Various blocks are denoted by "Block (EC)" with $EC_1$ being the lowest current EC among the available blocks of the memory device and $EC_N$ being the highest current EC. There can be an arbitrary number of blocks with each specific EC, as depicted with multiple blocks associated with some of the erase counts (e.g., as depicted, there are four blocks with $EC_5$ and three blocks with $EC_1$).

In some embodiments, the memory sub-system controller 115 performs the zone-to-block matching with the ultimate objective of ensuring that a distribution of physical memory blocks of the memory subsystem over their erase counts is as narrow as possible. For example, the zone-to-block matching can be performed so that the difference between the maximum erase count and the minimum erase count among blocks of the memory sub-system (or some part of the memory sub-system) is within a target count gap (which can be set by the memory controller or by the host system). In an ideal situation all memory blocks would have the same EC thus ensuring uniform wear of the memory device. Accordingly, the zone-to-block matching 300 can be performed in such a way that the highest EC blocks are provided to execute write requests associated with the zones having the lowest VN. Similarly, the lowest EC blocks are provided to execute write requests associated with the zones having the highest VN. For example, in one embodiment, once the controller 115 determines that a zone has the lowest VN (e.g., Zone ($VN_1$)), the controller 115 can select the highest EC block (e.g., Block ($EC_{N-1}$)) and execute the write request directed to the lowest-VN using the selected block. Conversely, once the controller 115 determines that a zone has the highest VN (e.g., Zone ($VN_M$)), the controller 115 can select the lowest EC block (e.g., Block ($EC_1$)) and execute the write request directed to the highest-VN zone using the selected block.

In some embodiments, blocks can be grouped into groups with each group including blocks with similar (but not necessarily equal) EC. For example, groups can include blocks so that the difference between the maximum erase count and the minimum erase count among blocks of the group is within a target range (which can be set by the memory controller or by the host system). For example, as depicted in FIG. 3, blocks with $EC_1$ and $EC_2$ can be included into group 1, blocks with $EC_3$ and $EC_4$ can be included into group 2, blocks with $EC_{N-1}$ and $EC_N$ can be included into group p, and so on. The controller 115 can use groups to speed up block matching. For example, because blocks within each group have similar EC, the controller 115 can avoid the need to determine the distribution of available blocks over EC every time a write request is received, and can instead select some block (e.g., a random block or a next block in a queue) of the respective group of blocks. The controller 115 can periodically (or at idle time, or both) determine the current distribution of blocks P(EC) over erase counts and reclassify the currently available blocks into groups. Similarly, the controller 115 can group zones into various categories (not depicted in FIG. 3) having similar (but not necessarily equal) zone VN. To speed up zone-to-block matching, the controller 115 can periodically (or at idle time, or both) determine the current distribution of zones P(VN) over version numbers and reclassify currently zones over different categories. In some embodiments, the number of zone categories can be equal to the number of block groups. Once zones and groups are determined the controller 115 can select a block from block group j to match the selected block with a write request associated with a zone belonging to zone category j. A block from a given group can be selected by a variety of algorithms. For example, a block can be selected from a group randomly, in one embodiment. In some embodiments, a block can be selected in the order of EC of blocks remaining in the group (e.g., starting from the lowest or the highest EC).

Figure 4:
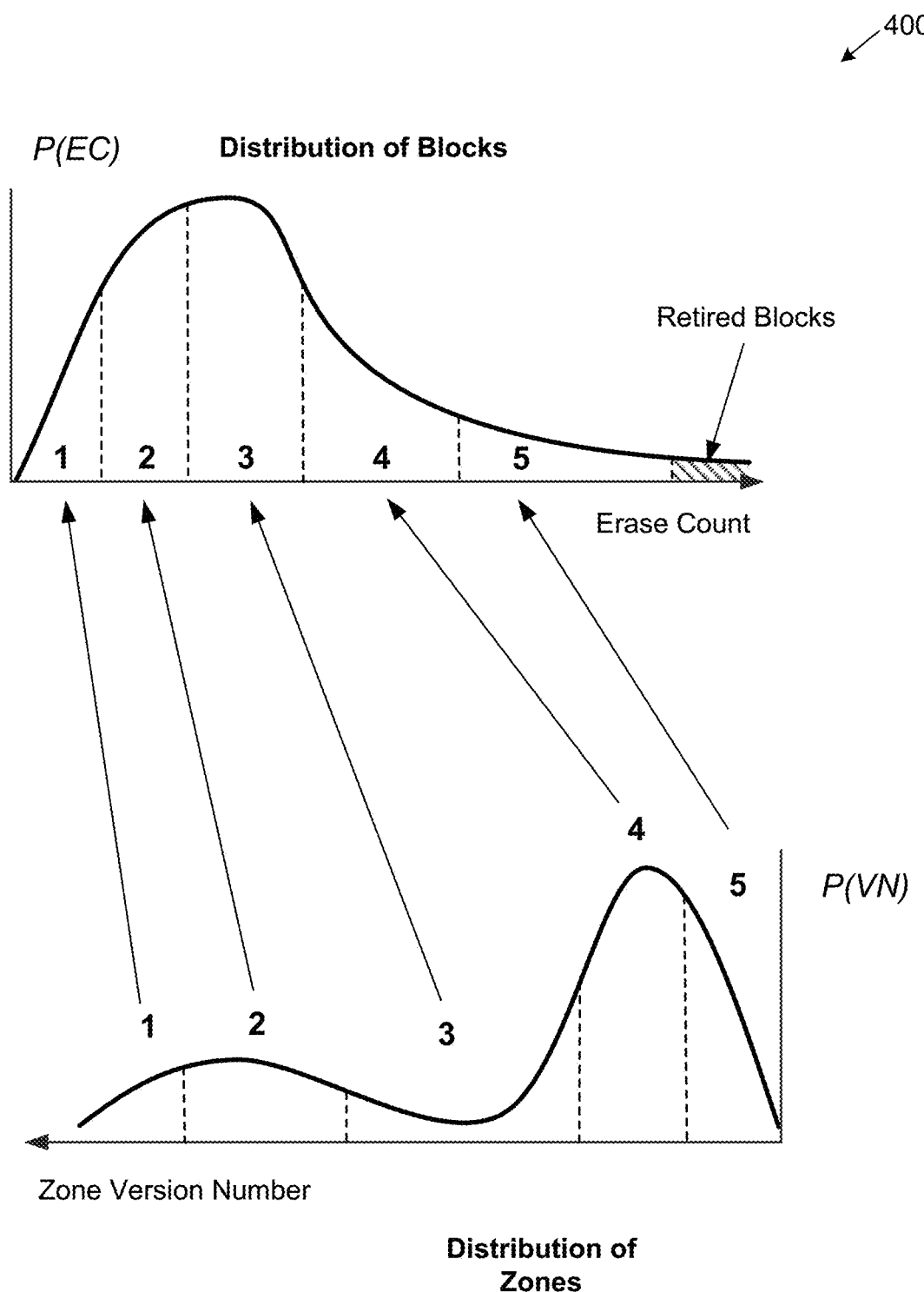
FIG. 4 illustrates schematically distribution-based zone-to-block matching in a zone-aware memory management, in accordance with some embodiments of the present disclosure.

FIG. 4 illustrates schematically distribution-based zone-to-block matching 400 in a zone-aware memory management, in accordance with some embodiments of the present disclosure. Depicted in FIG. 4 (top) is an exemplary distribution P(EC) of physical memory blocks over their erase counts. The distribution P(EC) is dynamic (time-dependent) and gradually shifts to the right (towards higher EC) during lifetime of the memory device. The depiction shown in FIG. 4 is to be understood as a snapshot in time of the distribution of blocks over EC at some point during exploitation of the memory device. Depicted in FIG. 4 (bottom) is an exemplary distribution P(VN) of zones over their version numbers. The distribution P(VN) is likewise dynamic and gradually shifts to the left (towards higher VN) during lifetime of the memory device (at least until a zone reset occurs, when the controller 115 or the host system 120 resets zone allocation to various applications supported by the memory device). The depiction shown in FIG. 4 is to be understood as a snapshot in time of the distribution of zones over VN. The controller 115 can monitor distributions P(EC) and P(VN) at periodic time intervals (e.g., quasi-continuously), or at downtime, or when a write request is received, or after a pre-determined number of write requests has been received since the last distribution monitoring.

The distributions P(EC) and P(VN) can be separated into groups and categories, which are indicated with numerals in FIG. 4. In some embodiments, the groups of blocks may be populated to ensure that equal or comparable numbers of blocks are within each group of blocks. Likewise, the categories of zones can be populated to ensure that equal or comparable numbers of zones are within each category of zones. For example, in one non-limiting embodiment, the groups and categories are based on respective percentiles of the two distributions. More specifically, group 1 of blocks can include blocks whose EC is within the bottom 20% of all available blocks, group 2 can include blocks whose EC is above the bottom 20% but below the bottom 40% of all available blocks, group 3 can include blocks whose EC is above the bottom 40% but below the top 40% of all available blocks, group 4 can include blocks whose EC is above the top 40% but below the top 20% of all available blocks, and group 5 can include blocks whose EC is within the top 20% of all available blocks. In some embodiments, "available" blocks exclude those blocks that have been erased over a certain number of times, e.g., belonging to a "tail" of P(EC). Such blocks can be retired (as depicted schematically in FIG. 4 with shading) and excluded from zone-to-block matching. The categories of zones can be populated in the same manner with the boundaries between the categories (depicted in FIG. 4 with dashed lines) set at the same percentiles.

In some embodiments, the controller 115 can populate groups of blocks and categories of zones according to a different scheme. For example, groups and categories can be populated based on the standard deviation σ of the respective distribution. For example, if three groups are used for zone-to-block matching, group 2 can include blocks whose EC is within ±0.5σ (±0.6σ, ±0.7σ, and so on) from the average (or median, mode, etc.) of the P(EC) distribution, group 1 can include blocks (zones) whose EC is below −0.5σ (−0.6σ, −0.7σ, etc.), whereas group 3 can include blocks (zones) whose EC is above +0.5σ (+0.6σ, +0.7σ, etc.). In some embodiments, the boundaries of the zone categories can mirror the boundaries of the block groups. Specifically, in the last example, category 1 can include zones whose VN is above +0.5σ (+0.6σ, +0.7σ, etc.) from the average (or median, mode, etc.) of the zone distribution P(VN), while category 3 can include zones whose VN is below −0.5σ (−0.6σ, −0.7σ, etc.). In other embodiments, however, the boundaries of the zone categories can be set differently from the boundaries of the respective block groups. For example, while block group 2 can include blocks within the range ±0.5σ while the corresponding zone category 2 can include zones within the range ±0.8σ.

In some embodiments, populating groups of blocks and categories of zones may be performed according to different schemes. For example, groups of blocks can be set using the percentiles whereas categories of zones can be set with reference to the standard deviation (or any other parameter of the respective distribution) or vice versa. A person skilled in the art should recognize that there exist virtually unlimited number of possibilities to associate a number of intervals (ranges) of a distribution P(EC) of available blocks to intervals (ranges) of a distribution P(VN) of existing zones so that the objective of keeping the two distributions as narrow as possible during operations of the memory device is achieved.

Figure 5:
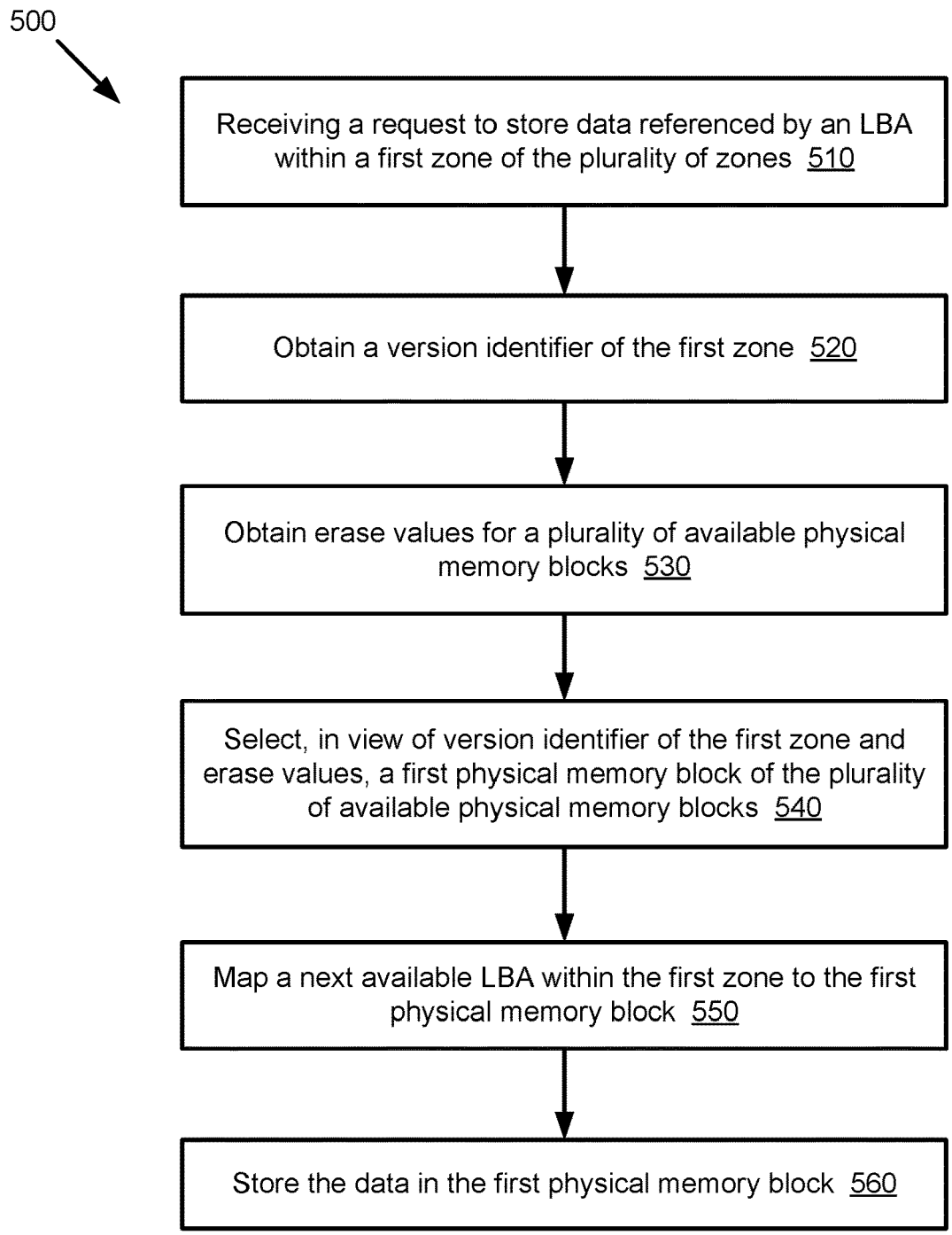
FIG. 5 illustrates a flow diagram of an example method of zone-aware memory management of memory devices, in accordance with some embodiments of the present disclosure.

FIGS. 5 and 6 illustrate method 500 and method 600, respectively. The method 500 or method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular order, unless otherwise specified, the order of the operations can be modified. Thus, the illustrated embodiments should be understood only as examples, and the illustrated operations can be performed in a different order, with some operations can be performed in parallel. Additionally, one or more operations can be omitted in various embodiments. Thus, not all operations of the method 500 or method 600 are required in every embodiment. Other operations flows are possible. In some embodiments, different operations can be used. It can be noted that aspects of the present disclosure can be used for any type of multi-bit memory cells.

FIG. 5 illustrates a flow diagram of an example method 500 of zone-aware memory management of memory devices, in accordance with some embodiments of the present disclosure. In one embodiment, the controller 115 of the memory sub-system (more, specifically, ZMC 113 of the controller 115) can perform the example method 500, based on instructions stored in the embedded memory of the local memory 119. In some embodiments, the firmware of the memory sub-system 110 (or memory device 130) can perform the example method 500. In some embodiments, an outside processing device, such as the processing device of the host system 120, can perform the example method 500.

Method 500 can be implemented in a memory device that includes a number of physical memory blocks. The memory device can have a logical address space that includes a plurality of zones (e.g., zoned namespaces), each zone having consecutive logical block addresses (LBAs). Method 500 can involve receiving a request to store data (operation 510). The request can reference an LBA in association with which the data is to be stored. The LBA may belong to e.g., a first zone of the memory device having multiple zones. (The terms "first," "second," and so on, as used in the instant specification, shall not be understood as always describing an actual order of the respective entities (e.g. zones, blocks, categories, groups, etc.). Although in some instances such order may indeed be explicitly used or implied, in other instances, the terms "first," "second," etc., refer to arbitrarily selected entities, which are not necessarily ordered in any way.) Each or some of the zones can be assigned to various applications being executed by the host system. A zone can be configured to require that all LBAs of the zone have to be invalidated if some information referenced by an LBA belonging to the zone is to be overwritten. At operation 520, the processing device performing method 500 can obtain a version identifier (VI) of the first zone. The VI of a zone can depend on a number of times the zone has been invalidated. For example, the VI of a zone can be equal to the number of times the zone has been invalidated or be a function, e.g. VI=$f$(N), of the number of times N the zone has been invalidated. In some embodiments, the function can be an increasing or decreasing function of the number of times the zone has been invalidated. For example, the first zone can be a zone that has a lowest VI among the zones of the memory device (or among some subset of the zones of the memory device). In some embodiments, where the function $f$(N) is a decreasing function of the number N, the first zone can be a zone that has the highest VI among the zones (or the subset of zones) of the memory device. In some embodiments, $f$(N)=N and the VI of the zone is equal to version number VN, as described above. In some embodiments, the version identifiers can be non-numerical representations (e.g., letters or other symbolic labels) of the version numbers.

At operation 530, the processing device performing method 500 can obtain erase values for available physical memory blocks of the memory device. Erase values may depend on the number of times the respective blocks have been erased (number of completed erase counts). In some embodiments, the erase values can be the same as erase counts. In some embodiments, the erase values can be numerical values, e.g., mathematical functions of the erase counts. In some embodiments, the erase values can be non-numerical representations (e.g., letters or other symbolic labels) of the erase counts. For example, available blocks can be blocks not currently storing any information, blocks storing information that has been invalidated, erased blocks, and so on. Some blocks of the memory device can be reserved for use by the memory controller 115, or by the host system 120 (or any of applications running thereon), and so on, and thus can be excluded from the plurality of the available blocks. At operation 540, method 500 can continue with selecting, in view of the first zone version identifier and erase values of the available blocks, a first physical memory block. In some embodiments, the first physical memory block has a highest erase value among a qualified subset of available physical memory blocks. For example, the qualified subset can include blocks whose erase value does not exceed a threshold erase value. Blocks having erase value above (or at) the threshold erase value can be retired and no longer used to store new information and can be excluded from a pool of available blocks, in one embodiment.

In some embodiments, to select the first physical memory block, the processing device can obtain a distribution P(VN) of version identifiers of the zones (a first distribution), and can further obtain a distribution P(EC) of erase values or counts (a second distribution) of the available physical memory blocks (or qualified available blocks). The processing device can then select the first physical memory block based on the first distribution and the second distribution. For example, in one embodiment, the processing device can identify a specified number of intervals of the first distribution and the specific number of intervals of the second distribution. The intervals can correspond to categories of zones and groups of blocks, as described above in relation to FIGS. 3 and 4. The intervals can be identified based on a pre-determined scheme of grouping zones and blocks, e.g., over intervals corresponding to pre-determined percentiles, intervals associated with standard deviations (or other parameters of the distributions), and so on. Selection of the physical memory blocks can be performed by negatively correlating a zone version identifier and a block erase value, in some embodiments. Specifically, the processing device can determine that the zone version identifier belongs to a j-th lowest version identifier interval of the first distribution and select the first physical memory block from a j-th highest erase value interval of the second distribution.

In one illustrative non-limiting example, once it is determined that the first zone has a lowest number of invalidation operations among the zones (e.g., the lowest version identifier), the processing device can select the first physical memory block from blocks that have a highest erase value among the available blocks. In another illustrative non-limiting example, once the processing device determines that the first zone is not the zone having the lowest number of invalidation operations among the zone (e.g., having a version identifier different from the lowest version identifier), the processing device can select the first physical memory block from blocks that have the lowest erase value among the available blocks.

At operation 550, the processing device performing method 500 can map the next available LBA of the first zone to the selected first physical memory block, and at operation 560 can store the data in the first physical memory block.

Figure 6A:
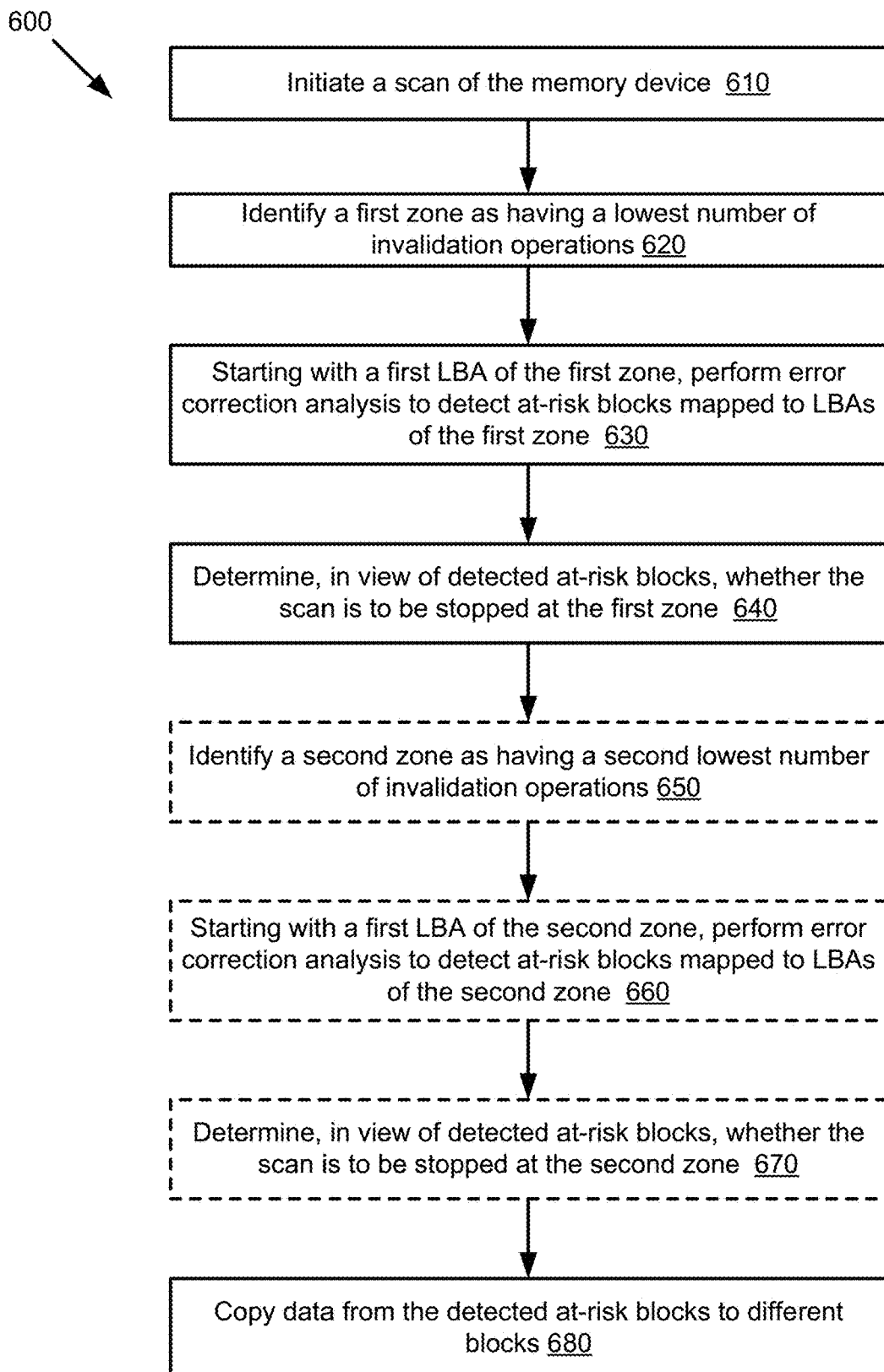
FIG. 6A illustrates a flow diagram of an example method of performing zone-aware background scans in memory devices, in accordance with some embodiments of the present disclosure.
Figure 6B:
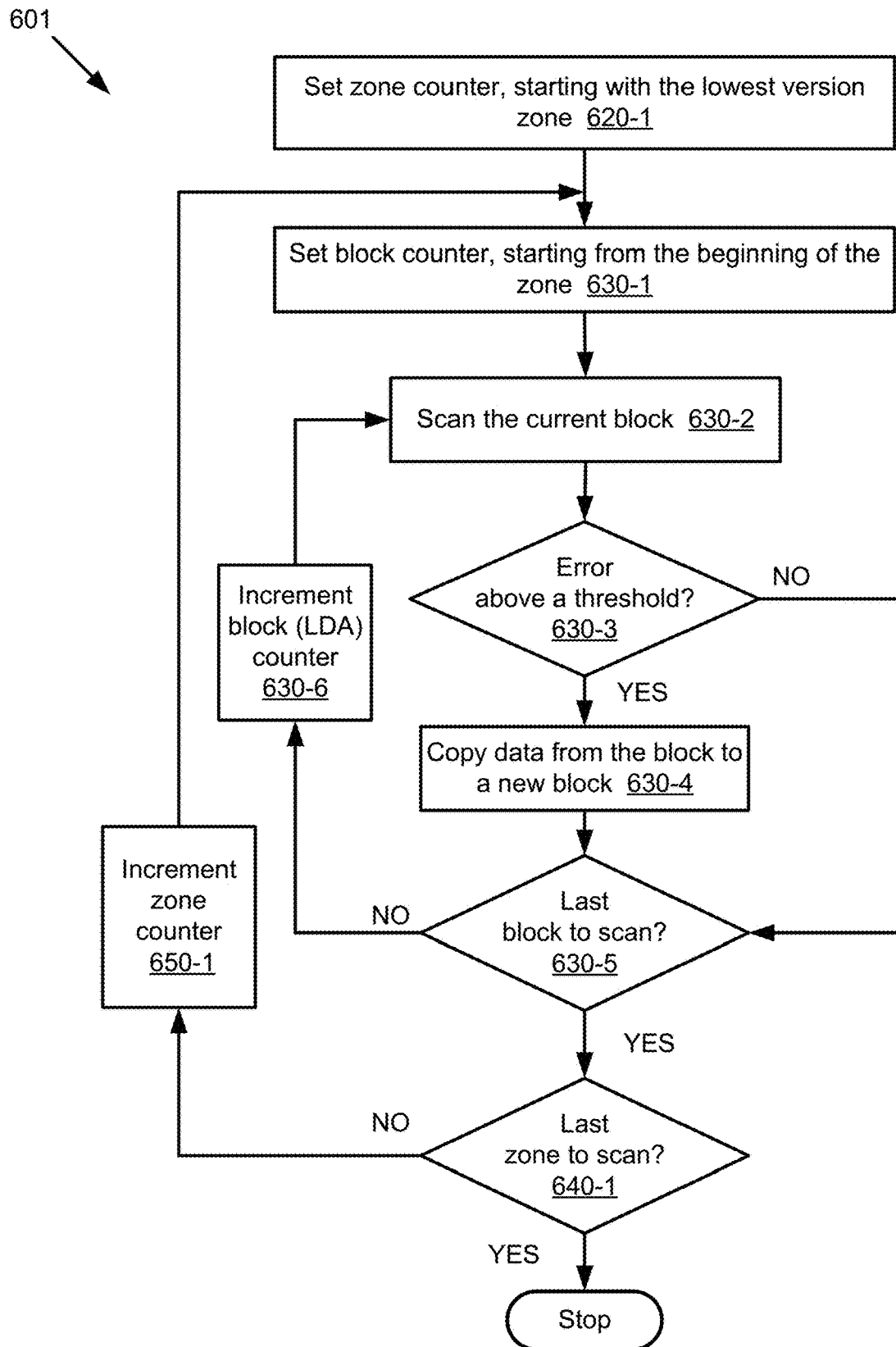
FIG. 6B is a flow diagram of one possible embodiment of method illustrated in FIG. 6A, in accordance with some embodiments of the present disclosure.

FIG. 6A illustrates a flow diagram of an example method 600 of performing zone-aware background scans in memory devices, in accordance with some embodiments of the present disclosure. In one embodiment, the controller 115 of the memory sub-system (more, specifically, ZMC 113 of the controller 115) can perform the example method 600, based on instructions stored in the embedded memory of the local memory 119. In some embodiments, the firmware of the memory sub-system 110 (or memory device 130) can perform the example method 600. In some embodiments, an outside processing device, such as the processing device of the host system 120, can perform the example method 600. FIG. 6B is a flow diagram of one possible embodiment 601 of method 600, in accordance with some embodiments of the present disclosure.

Method 600 can involve initiating a scan of the memory device (operation 610). In some embodiments, the scan can be initiated at regular time intervals, at idle time, or responsive to a failure of memory operation (e.g., a read or a write operation, or a certain number of such operations). In some embodiments, the scan can be initiated by the controller 115, based on instructions stored in the local memory 119 or based on instructions received from the host system 120. In some embodiments, the scan can be initiated and performed by the host system 120. At operation 620, the processing device performing method 600 can identify a first zone as having a lowest version identifier among the zones of the memory device. In some embodiments, the physical memory blocks mapped to the LBAs of the first zone have the same first erase value. In some embodiments, in addition to identifying the first zone, the processing device can identify at least a plurality of zones of the memory device that are subject to scanning. The identified zones can be ranked in the order of their version identifier. As indicated by block 620-1 in FIG. 6B, in some embodiments, the processing device can set a zone counter starting with the zone having the lowest version identifier (e.g., the first zone).

At operation 630, method 600 can continue with the processing device performing error correction code (ECC) analysis to detect at-risk physical memory blocks mapped to consecutive LBAs of the first zone. As indicated by block 630-1 in FIG. 6B, in some embodiments, the processing device can set a block counter starting from the beginning of the zone (i.e., starting from the blocks storing the oldest data) and scan consecutive blocks (step 630-2, as shown in FIG. 6B). For example, the processing device performing method 600 can select (e.g., randomly, or according to a pre-determined pattern) some pages of the current block and determine bit error rate (BER) for the current block. If it is determined, at a decision-making step 630-3, that the current block's BER is above a certain pre-determined BER threshold, the current block can be "folded." Namely, the data from the current block can be moved to an available physical memory block (which may be associated with the next available LBA of the zone), and the current block can be tagged as an invalid block.

In some embodiments, all blocks that are currently storing data may be scanned within a zone that is being tested (e.g., the first zone). In other embodiments, a limited number of blocks can be tested and the scan of the zone can be ceased provided that some pre-determined first condition is satisfied. For example, if it is determined (step 630-5, as shown in FIG. 6B) that n of m physical memory blocks associated with the last m LBAs have BER below the BER threshold, the scan of the current zone can be ceased. Because in the zone-aware memory management consecutive LBAs are used in write operations in a chronological order, the untested LBAs are associated with data that has been stored for a lesser time (than the tested LBAs) and are less likely to map to at-risk physical memory blocks. If, however, it is determined by the processing device, that the scan of the current zone is to be continued, the processing device can increment a block counter (operation 630-6, as shown in FIG. 6B) and repeat the loop 630-2-630-5 for a memory block mapped to the next LBA of the zone.

Once the scan of the first zone is compete (all blocks have been tested) or ceased (a sufficient number of blocks of the zone are found not to be at-risk), method 600 can continue with determining, at operation 640, whether the scan of the memory device is to be stopped (provided that some pre-determined second condition is satisfied) at the first zone or whether the second zone has to be scanned as well. In some embodiments, to stop the scan at the first (or any subsequent) zone, the processing device is to determine that the first (or any subsequent) zone has no more than a certain pre-determined number p of at-risk blocks, or no more than a certain pre-determined percentage of at-risk blocks, or a certain number of blocks that are not at risk, or any other criterion of virtually unlimited number of possibilities. In some embodiments, the untested blocks of the zone (if the scan of the zone is ceased before all LBAs of the zone has been tested) can be assumed to be not at risk. In some embodiments, some of the untested blocks can be assumed to be at risk in the same proportion as in the last m tested blocks of the zone, or in the same proportion as in all tested blocks of the zone, and so on. In some embodiments, more than one zone has to satisfy one of the aforementioned (or other) conditions.

If it is determined that the scan of the memory device is to be stopped at the first zone ("YES" outcome of the decision-making block 640-1, as shown in FIG. 6B), the processing device can stop the scan. If it is determined, however, that the scan of the memory device is not to be stopped at the first (or any subsequent) zone, method 600 may continue with identifying a second (or any subsequent) zone as having a second (or any subsequent) lowest version identifier of the plurality of zones (operation 650). In some embodiments, the physical memory blocks mapped to the LBAs of the second zone have the same second erase value, the second erase value being higher that (or at least, equal to)

the first erase value. As a result, the processing device can, in one embodiment, increment a zone counter (block 650-1, as shown in FIG. 6B) and repeat the loop 630-1-640-1 for the second (or any subsequent) zone. Specifically, at operation 660, the processing device can, perform error correction analysis (starting with a first LBA of the second zone) to detect at-risk physical memory blocks mapped to consecutive LBAs of the second zone, and determine, at operation 670, in view of detected at-risk physical memory blocks mapped to LBAs of the second zone, whether the scan of the memory device is to be stopped at the second zone. Method 600 can continue until 1) all zones are scanned, or 2) the scan is stopped once it is determined (e.g., at operation 640-1) that no further zones are to be tested.

FIG. 6C schematically illustrates an example zone-aware background scan 602 performed in accordance with some embodiments of the present disclosure. Schematically depicted are first six zones ranked in order of increased version identifier, each zone having seven LBAs mapped to their respective physical memory blocks. The background scan is performed in the directions indicated by the arrows. A block having BER above (or at) a threshold is tagged as "Fail" while blocks having BER below the threshold is tagged as "Pass." In the illustrative example of FIG. 6C, a scan of a given zone is ceased once three of the last four blocks receive the "Pass" tag (the first condition). The untested blocks are indicated by shading. Furthermore, in the illustrative example of FIG. 6C, a scan of the memory device is stopped if over two-thirds of the blocks associated with each of the last two zones receive the "Pass" tag (the second condition), with the untested blocks assumed to have received the "Pass" tag. As depicted in FIG. 6C, all blocks of the first and the second zone are scanned, whereas a scan of the third zone is ceased after the first six blocks are tested (the first condition is satisfied for the third zone). The scan of the fourth zone is stopped after testing only three blocks, at which point the scan of the memory device is stopped (the first condition is satisfied for the fourth zone). No further zones are tested because more that two-thirds of the blocks associated with the third zone (5 out of 7) and the fourth zone (7 out of 7) receive the "Pass" tag (the second condition is satisfied).

Figure 7:
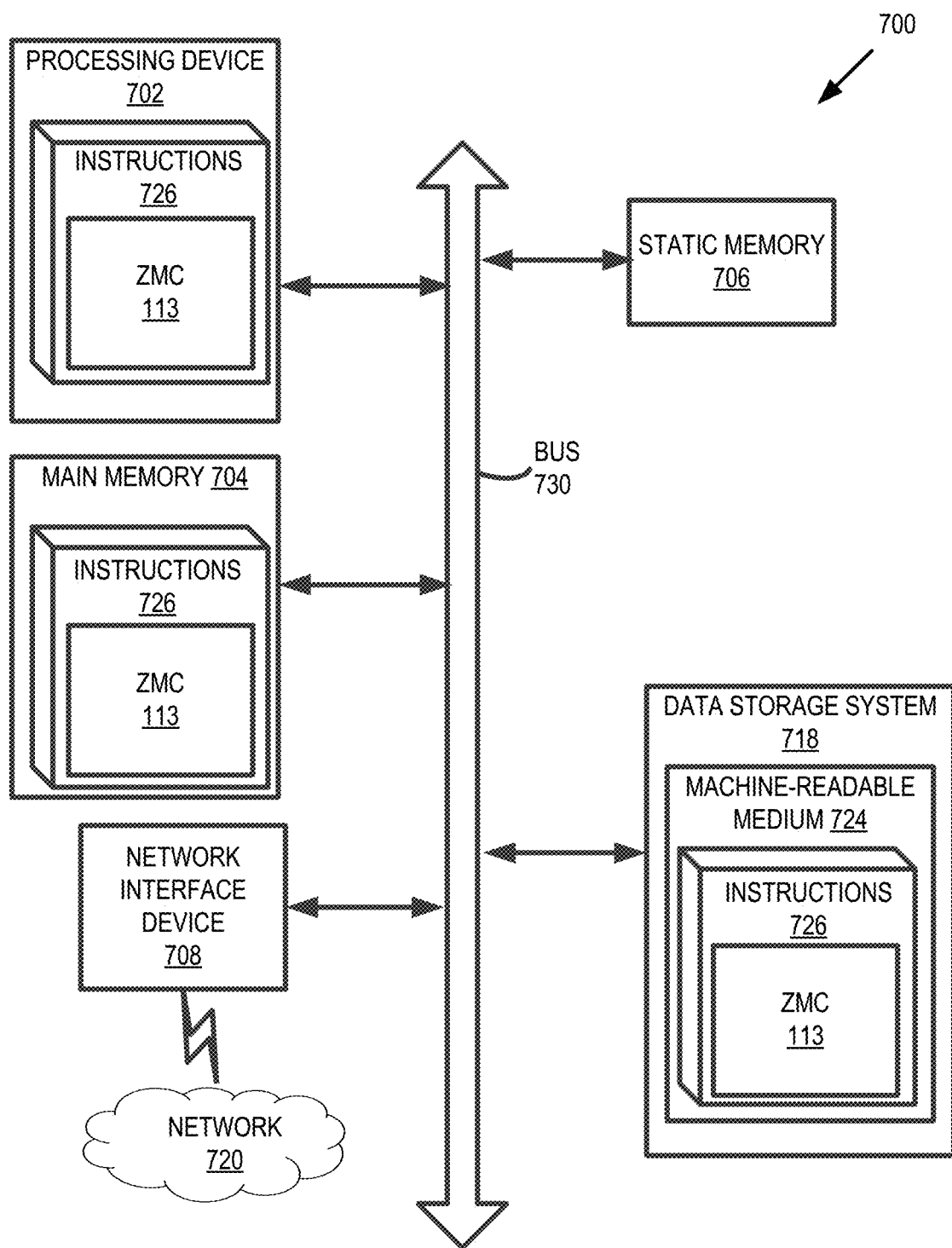
FIG. 7 a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the zone-aware memory management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a non-transitory computer-readable storage medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 17 of FIG. 1.

In one embodiment, the instructions 726 include instructions to implement functionality corresponding to the ZMC 113 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the disclosure. The term "machine-readable storage medium" shall accordingly be taken to include, but not be limited to, solid-state memories, optical media, and magnetic media.

Some portions of the preceding detailed descriptions have been presented in terms of operations and symbolic representations of operations on data bits within a computer memory. These algorithmic descriptions and representations are the ways used by those skilled in the data processing arts to most effectively convey the substance of their work to others skilled in the art. An algorithm or operation is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms, operations, and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an embodiment" or "one embodiment" or the like throughout is not intended to mean the same embodiment or embodiment unless described as such. One or more embodiments or embodiments described herein may be combined in a particular embodiment or embodiment. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a plurality of physical memory blocks and associated with a logical address space that comprises a plurality of zones, wherein each zone comprises a plurality of logical block addresses (LBAs); and
a processing device, operatively coupled with the memory device, to perform operations comprising:
receiving a request to store data referenced by an LBA associated with a first zone of the plurality of zones;
obtaining a version identifier of the first zone, wherein the version identifier of the first zone characterizes a number of times the first zone has been invalidated, wherein invalidating the first zone comprises invalidating all LBAs of the first zone;
obtaining erase values for a plurality of available physical memory blocks of the memory device, wherein each erase value represents a number of completed erase operations for a respective one of the plurality of memory blocks;
selecting, in view of the version identifier of the first zone and the erase values, a first physical memory block of the plurality of available physical memory blocks;
mapping a next available LBA associated with the first zone to the first physical memory block; and
storing the data in the first physical memory block.

2. The system of claim 1, wherein each of the plurality of zones is invalidated by moving a write pointer to a first LBA of a respective zone.

3. The system of claim 1, wherein overwriting information referenced by the LBA associated with the first zone comprises invalidating at least some LBAs of the first zone.

4. The system of claim 1, wherein the first zone has a lowest number of invalidation operations as a whole among the plurality of zones, and wherein the first physical memory block has a highest erase value among a subset of available physical memory blocks whose erase value does not exceed a threshold erase value.

5. The system of claim 1, wherein the first zone is different from a zone having a lowest number of invalidation operations as a whole among the plurality of zones, and wherein the first physical memory block has a lowest erase value among the plurality of available physical memory blocks.

6. The system of claim 1, wherein selecting the first physical memory block comprises:
  obtaining a first distribution of version identifiers of the plurality of zones;
  obtaining a second distribution of erase values of the plurality of available physical memory blocks; and
  selecting the first physical memory block based on the first distribution and the second distribution.

7. The system of claim 6, wherein selecting the first physical memory block based on the first distribution and the second distribution comprises:
  dividing the first distribution into a first plurality identifying a specified number of version identifier intervals of the first distribution;
  dividing the second distribution into a second plurality identifying the specified number of erase value intervals of the second distribution;
  identifying that the version identifier of the first zone belongs to a j-th lowest version identifier interval of the first distribution; and
  selecting the first physical memory block from a j-th highest erase value interval of the second distribution.

8. The system of claim 1, wherein the request to store data is generated by an application executed by a host computing system communicatively coupled to the memory device, and wherein the first zone is assigned to the application.

9. The system of claim 1, wherein the operations further comprise:
  initiating a scan of the memory device;
  identifying the first zone of the plurality of zones as a zone having a lowest version identifier;
  starting with a first LBA of the first zone, performing error correction analysis to detect at-risk physical memory blocks mapped to consecutive LBAs of the first zone; and
  selecting an action, based on a comparison of a number of detected at-risk physical memory blocks mapped to at least a subset of LBAs of the first zone to a threshold number of at risk-blocks, from at least one of:
    stopping the scan of the memory device at the first zone, if the number of detected at-risk physical memory blocks mapped to the subset of LBAs of the first zone is below the threshold number of at risk-blocks, or
    continuing the scan of the memory device beyond the first zone, if the number of detected at-risk physical memory blocks mapped to the subset of LBAs of the first zone is above the threshold number of at risk-blocks.

10. The system of claim 9, wherein the operations further comprise:
  upon determining that the number of detected at-risk physical memory blocks mapped to the subset of LBAs of the first zone is above the threshold number of at risk-blocks, identifying a second zone as having a second lowest version identifier of the plurality of zones;
  starting with a first LBA of the second zone, performing error correction analysis to detect at-risk physical memory blocks mapped to consecutive LBAs of the second zone; and
  selecting a subsequent action, based on a comparison of a number of detected at-risk physical memory blocks mapped to at least a subset of LBAs of the second zone to the threshold number of at risk-blocks, from at least one of:
    stopping the scan of the memory device at the second zone, if the number of detected at-risk physical memory blocks mapped to the subset of LBAs of the second zone is below the threshold number of at risk-blocks, or
    continuing the scan of the memory device beyond the second zone, if the number of detected at-risk physical memory blocks mapped to the subset of LBAs of the second zone is above the threshold number of at risk-blocks.

11. A system comprising:
  a memory device comprising a plurality of physical memory blocks and associated with a logical address space that comprises a plurality of zones, wherein each zone comprises a plurality of logical block addresses (LBAs), and
  a processing device, operatively coupled with the memory device, to perform operations comprising:
    initiating a scan of the memory device;
    identifying a first zone of the plurality of zones as a zone having a lowest version identifier, wherein the version identifier of a zone reflects a number of times the zone has been invalidated, wherein invalidating the first zone comprises invalidating all LBAs of the first zone;
    starting with a first LBA of the first zone, performing error correction analysis to detect at-risk physical memory blocks mapped to consecutive LBAs of the first zone; and
    selecting an action, based on a comparison of a number of detected at-risk physical memory blocks mapped to at least a subset of LBAs of the first zone to a threshold number of at risk-blocks, from at least one of:
      stopping the scan of the memory device at the first zone, if the number of detected at-risk physical memory blocks mapped to the subset of LBAs of the first zone is below the threshold number of at risk-blocks, or
      continuing the scan of the memory device beyond the first zone, if the number of detected at-risk physical memory blocks mapped to the subset of LBAs of the first zone is above the threshold number of at risk-blocks.

12. The system of claim 11, wherein the operations further comprise:
  upon determining that the number of detected at-risk physical memory blocks is below the threshold number of at-risk blocks, stopping the scan of the memory device.

13. The system of claim 11, wherein the operations further comprise:
  upon determining that the number of detected at-risk physical memory blocks mapped to the subset of LBAs of the first zone is above the threshold number of at risk-blocks, identifying a second zone as having a second lowest identifier number of the plurality of zones;
  starting with a first LBA of the second zone, performing error correction analysis to detect at-risk physical memory blocks mapped to consecutive LBAs of the second zone; and
  selecting a subsequent action, based on a comparison of a number of detected at-risk physical memory blocks mapped to at least a subset of LBAs of the second zone to the threshold number of at risk-blocks, from at least one of:
- stopping the scan of the memory device at the second zone, if the number of detected at-risk physical memory blocks mapped to the subset of LBAs of the second zone is below the threshold number of at risk-blocks, or
- continuing the scan of the memory device beyond the second zone, if the number of detected at-risk physical memory blocks mapped to the subset of LBAs of the first zone is above the threshold number of at risk-blocks.

14. A system of claim 13, wherein the physical memory blocks mapped to at least the subset of the LBAs of the first zone have a same first erase value.

15. A system of claim 14, wherein the physical memory blocks mapped to at least a subset of the LBAs of the second zone have a same second erase value, wherein the second erase value is higher than the first erase value.

16. The system of claim 14, wherein the operations further comprise:
- upon determining that the number of detected at-risk physical memory blocks mapped to the subset of LBAs of the second zone is above the threshold number of at risk-blocks, identifying a third zone as having a third lowest version identifier of the plurality of zones;
- starting with a first LBA of the third zone, performing error correction analysis to detect at-risk physical memory blocks mapped to consecutive LBAs of the third zone; and
- selecting a next subsequent action, based on a comparison of a number of a number of detected at-risk physical memory blocks mapped to at least a subset of LBAs of the third zone to the threshold number of at risk-blocks, from at least one of:
  - stopping the scan of the memory device at the third zone, if the number of detected at-risk physical memory blocks mapped to the subset of LBAs of the third zone is below the threshold number of at risk-blocks, or
  - continuing the scan of the memory device beyond the third zone, if the number of detected at-risk physical memory blocks mapped to the subset of LBAs of the third zone is above the threshold number of at risk-blocks.

17. A system of claim 11, wherein the operations performed by the processing device further comprise:
- receiving a request to store data in association with the first zone of the plurality of zones;
- obtaining a version identifier of the first zone;
- obtaining erase values for a plurality of available physical memory blocks;
- selecting, in view of the version identifier of the first zone and the obtained erase values, a target physical memory block of the plurality of available physical memory blocks;
- mapping the target physical memory block to a next available LBA associated with the first zone; and
- storing the data in the target physical memory block.

18. A method comprising:
- receiving, by a processing device operatively coupled with a memory device, a request to store data referenced by a logical block address (LBA) associated with a first zone of a plurality of zones, wherein each zone comprises a plurality of logical block addresses (LBAs) of a logical address space of the memory device, the memory device having a plurality of physical memory blocks;
- obtaining, by the processing device, a version identifier of the first zone, wherein the version identifier of the first zone characterizes a number of times the first zone has been invalidated, wherein invalidating the first zone comprises invalidating all LBAs of the first zone;
- obtaining, by the processing device, erase values for a plurality of available physical memory blocks of the memory device, wherein each erase value represents a number of completed erase operations for a respective one of the plurality of available memory blocks;
- selecting, by the processing device, in view of the version identifier of the first zone and the erase values, a first physical memory block of the plurality of available physical memory blocks;
- mapping, by the processing device, a next available LBA associated with the first zone to the first physical memory block; and
- storing, by the processing device, the data in the first physical memory block.

19. The method of claim 18, wherein the first zone has a lowest number of invalidation operations among the plurality of zones, and wherein the first physical memory block has a highest erase value among a subset of available physical memory blocks whose erase value does not exceed a threshold erase value.

* * * * *